(12) United States Patent
Cabo

(10) Patent No.: US 8,657,350 B2
(45) Date of Patent: Feb. 25, 2014

(54) IMPACT PROTECTION DEVICE FOR AN UNDERBODY-MOUNTED MEMBER OF A MOTOR VEHICLE

(75) Inventor: Jose Cabo, Saint Germain de la Grange/Chatron (FR)

(73) Assignee: Renault S.A.S., Boulogne Billancourt (FR)

( * ) Notice: Subject to any disclaimer, the term of this patent is extended or adjusted under 35 U.S.C. 154(b) by 0 days.

(21) Appl. No.: 13/500,517

(22) PCT Filed: Sep. 7, 2010

(86) PCT No.: PCT/FR2010/051859
§ 371 (c)(1),
(2), (4) Date: May 16, 2012

(87) PCT Pub. No.: WO2011/042633
PCT Pub. Date: Apr. 14, 2011

(65) Prior Publication Data
US 2013/0057025 A1 Mar. 7, 2013

(30) Foreign Application Priority Data
Oct. 6, 2009 (FR) ..................................... 09 56942

(51) Int. Cl.
*B60R 19/56* (2006.01)
(52) U.S. Cl.
USPC ...................... 293/102; 296/187.11; 180/69.1
(58) Field of Classification Search
USPC ............. 296/187.08, 187.11, 193.08, 193.07, 296/203.04, 204, 199, 39.1; 180/69.1; 293/102
See application file for complete search history.

(56) References Cited

U.S. PATENT DOCUMENTS

| 4,655,307 | A | * | 4/1987 | Lamoureux | 180/69.1 |
|---|---|---|---|---|---|
| 4,810,028 | A | * | 3/1989 | Henricks | 296/187.03 |
| 5,612,606 | A | | 3/1997 | Guimarin et al. | |
| 5,992,926 | A | * | 11/1999 | Christofaro et al. | 296/204 |
| 6,202,778 | B1 | * | 3/2001 | Mistry et al. | 180/69.1 |
| 6,435,298 | B1 | * | 8/2002 | Mizuno et al. | 180/346 |
| 6,516,907 | B2 | * | 2/2003 | Robinson | 180/69.1 |

(Continued)

FOREIGN PATENT DOCUMENTS

FR 2 890 366 3/2007

OTHER PUBLICATIONS

International Search Report issued on Nov. 22, 2010 in PCT/FR10/51859 filed on Sep. 7, 2010.

(Continued)

*Primary Examiner* — Glenn Dayoan
*Assistant Examiner* — Gregory Blankenship
(74) *Attorney, Agent, or Firm* — Oblon, Spivak, McClelland, Maier & Neustadt, L.L.P.

(57) ABSTRACT

An impact protection device for a motor-vehicle member mounted protrudingly beneath the body thereof, including a fairing element configured to be rigidly connected to at least one structural body element of the motor vehicle located between one extremity of the motor vehicle from which an obstacle may appear during a maneuver of the motor vehicle and the motor-vehicle member. The fairing element includes a lower support surface extending beneath the body substantially between the extremity of the motor vehicle and the motor-vehicle member along a negative incline, such that the low point of the lower support surface is lower than the low point of the motor-vehicle member along a vertical axis of the motor vehicle.

10 Claims, 2 Drawing Sheets

(56) References Cited

U.S. PATENT DOCUMENTS

| | | | |
|---|---|---|---|
| 6,726,273 B2 * | 4/2004 | Kruschhausen et al. | 296/204 |
| 6,890,010 B2 * | 5/2005 | Bergman | 293/117 |
| 7,055,895 B1 * | 6/2006 | King et al. | 296/204 |
| 7,753,161 B2 * | 7/2010 | Byers et al. | 180/312 |
| 7,913,788 B1 * | 3/2011 | Bryer et al. | 180/68.5 |
| 8,366,170 B2 * | 2/2013 | Glickman | 296/39.3 |
| 8,366,470 B2 * | 2/2013 | Sakakura | 439/272 |
| 2002/0179353 A1 * | 12/2002 | Robinson | 180/69.1 |
| 2007/0128507 A1 | 6/2007 | Watanabe et al. | |
| 2009/0152034 A1 * | 6/2009 | Takasaki et al. | 180/68.5 |
| 2011/0079978 A1 * | 4/2011 | Schreiner et al. | 280/124.1 |
| 2013/0057025 A1 * | 3/2013 | Cabo | 296/187.08 |

OTHER PUBLICATIONS

French Search Report issued on Jan. 20, 2010 in French Patent Application FR 09 56942 filed on Oct. 6, 2009.

* cited by examiner

IMPACT PROTECTION DEVICE FOR AN UNDERBODY-MOUNTED MEMBER OF A MOTOR VEHICLE

BACKGROUND

This invention relates to an impact protection device for a motor-vehicle member mounted protrudingly beneath the body of the motor vehicle.

The invention applies particularly to the protection of motor-vehicle traction batteries.

Motor-vehicle traction batteries are designed to be installed beneath the body of the motor vehicle, in an underbody section extending towards the front of the vehicle from a back wall of the luggage compartment of the motor vehicle. The traction battery may be suspended beneath the body of the motor vehicle such that, depending on the battery and/or vehicle body arrangements, the battery may be in a prominent underbody position along the vertical axis of the vehicle such that it is not protected by any other rear member of the motor vehicle and, in particular, by any structural body element, able to protect the battery from obstacles on the ground that are both lower than the luggage-compartment back wall and taller than the low point of the traction battery. This configuration poses a risk to the physical integrity of the traction battery during particular maneuvers of the motor vehicle, for example, when reversing onto a sidewalk or towards a boundary stone.

Furthermore, if this battery is removable so that it can be replaced for example at a battery exchange station such as the one described in document U.S. Pat. No. 5,612,606, the need to provide easy access to the traction battery, which must be quickly and easily removable, precludes the possibility of including a protection element that would be installed directly beneath the traction battery.

BRIEF SUMMARY

In this context, the invention is intended to provide a protection device for a motor-vehicle member installed protrudingly beneath the body of the motor vehicle, that is intended to protect such members against underbody impacts, i.e. impacts caused by obstacles on the ground that are taller than the low point thereof along the vertical axis of the vehicle, such as blocks, boundary markers and sidewalks, that are liable to occur during particular maneuvers of the motor vehicle.

For this purpose, the device according to the invention and the generic definition given in the preamble above is essentially characterized in that it includes a fairing element designed to be rigidly connected to at least one structural body element of said motor vehicle located between one extremity of said motor vehicle from which an obstacle may appear during a maneuver of the motor vehicle and said motor-vehicle member, said fairing element comprising a lower support surface extending beneath the body substantially between said extremity of the motor vehicle and said motor-vehicle member along a negative incline, such that the low point of said support surface is lower than the low point of said motor-vehicle member along a vertical axis of said motor vehicle.

According to one embodiment, the fairing element is designed to be rigidly connected to an external face of a bottom cover plate of the luggage-compartment back of the motor vehicle.

According to a specific embodiment, the fairing element is designed to be rigidly connected to spars of the motor vehicle.

According to this specific embodiment, the fairing element may comprise linking means extending from either side of the lower support surface of said fairing element, such as to be able to bear against a lower face of the spars of the motor vehicle.

The incline of the lower support surface of said fairing element may be between 1° and 45° and, preferably, approximately 5°.

Preferably, said fairing element is designed to be rigidly connected to at least one structural body element of said motor vehicle located between a rear extremity of said motor vehicle and said motor-vehicle member, such as to protect the member from impacts when the vehicle is reversing.

This arrangement ensures that the protection device according to the invention is installed at the rear of the vehicle such that it is placed between a potential obstacle located behind the motor-vehicle and the motor-vehicle member installed beneath the body, during maneuvers of the motor vehicle in which the member needs to be protected. Furthermore, the protection device according to the invention has a lower support surface beneath the body forming a negative-incline ramp, on which the obstacle is advantageously caused to slide during maneuvers of the vehicle, such as to enable the motor vehicle to be lifted by contact with the obstacle, and therefore, simultaneously, to enable the motor-vehicle member installed beneath the body to be lifted above the obstacle.

BRIEF DESCRIPTION OF THE DRAWINGS

Further details and advantages of the invention are set out in the description of a specific embodiment of the invention given below as a non-limiting example, with reference to the attached drawings in which.

DETAILED DESCRIPTION

Figure 1:
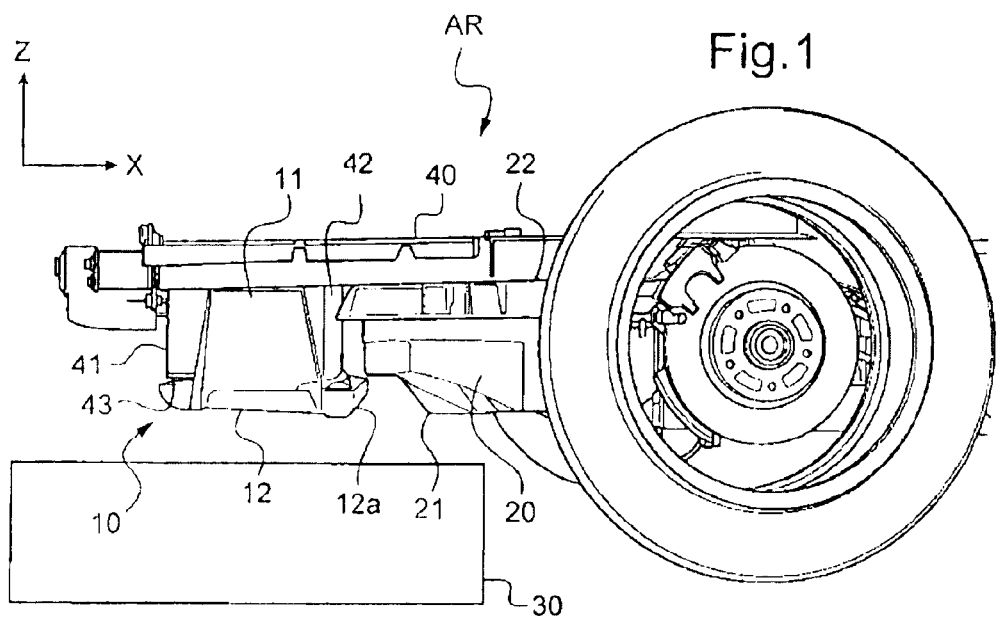
FIG. 1 is a side view of the rear of a motor vehicle in which the protection device according to the invention is installed, in a first "idle" arrangement, in which no stress is exerted on the protection device (obstacle lower along Z than the low point of the member)

FIG. 1 therefore illustrates a rear section AR of a motor vehicle and, in particular a structural body part 40 located between the rear extremity of the motor vehicle and the rear axle of the vehicle. This structural body part 40 includes a luggage-compartment back comprising a luggage-compartment tray 41 attached to the body, and made of plastic, for example. However, the luggage-compartment back may also be formed directly by the sheet of the body forming the body end wall 42.

A traction battery 20 is installed beneath the body on an element of the body structure of the motor vehicle extending towards the front of the motor vehicle from the luggage-compartment back. More specifically, the traction battery 20 is installed removably on the body end wall 42 and is for example attached beneath the body to the spars, such that the traction battery 20 is positioned protruding downwards along the vertical axis Z of the motor vehicle, in relation to the other elements of the body structure and, in particular, in relation to the bottom cover plate 43 of the luggage-compartment back 41.

To protect the traction battery 20 from obstacles liable to pass beneath the luggage-compartment back when reversing the vehicle and that are taller along Z than the low point 21 of the traction battery represented by the bottom of the battery, a rear-impact protection device 10 is installed on the vehicle behind the location of the traction battery.

More specifically, the rear-impact protection device comprises a fairing element 11 designed to be rigidly connected to a structural body element of the motor vehicle located between the rear extremity of the motor vehicle and the traction battery 20, such that it is placed between the obstacle and the battery during maneuvers in which the battery is to be protected.

The function of the fairing element 11 forming the rear-impact protection device is to lift the motor vehicle by contact with the obstacle, so that the traction battery is lifted above the obstacle.

To do so, the fairing element 11 has a lower support surface 12 extending beneath the body substantially between the rear extremity of the motor vehicle and the traction battery along a negative incline or, in other words, the lower support surface 12 creates an angle from a longitudinal axis X of the motor vehicle in a clockwise direction. Thus, the low point 12a of the support surface 12 is located towards the front of the vehicle and is lower than the low point 21 of the traction battery 20 installed beneath the body in front of the fairing element 11

The fairing element 11 therefore has a negative-incline ramp shape, enabling the obstacle to slide on it and thereby lift the motor vehicle and, in particular, the traction battery 20, above the obstacle. This prevents the sudden stopping of the vehicle along the longitudinal axis X, which could jeopardize the comfort and safety of the occupants, the vehicle being stopped progressively on the obstacle, warning the driver of the presence of the obstacle.

For this purpose, the incline of the lower support surface 12 of the fairing element must be as slight as possible to maximize the stresses along the vertical axis Z of the motor vehicle, which are in part absorbed by the springs of the rear axle and by the structural elements able to withstand or absorb these stresses (spars, luggage-compartment tray) and to minimize them along the longitudinal axis X of the motor vehicle, where it [is] more difficult to transmit stresses. The incline will advantageously be within a range of values from 1° to 45° and shall preferably be approximately 45°.

Figure 3:
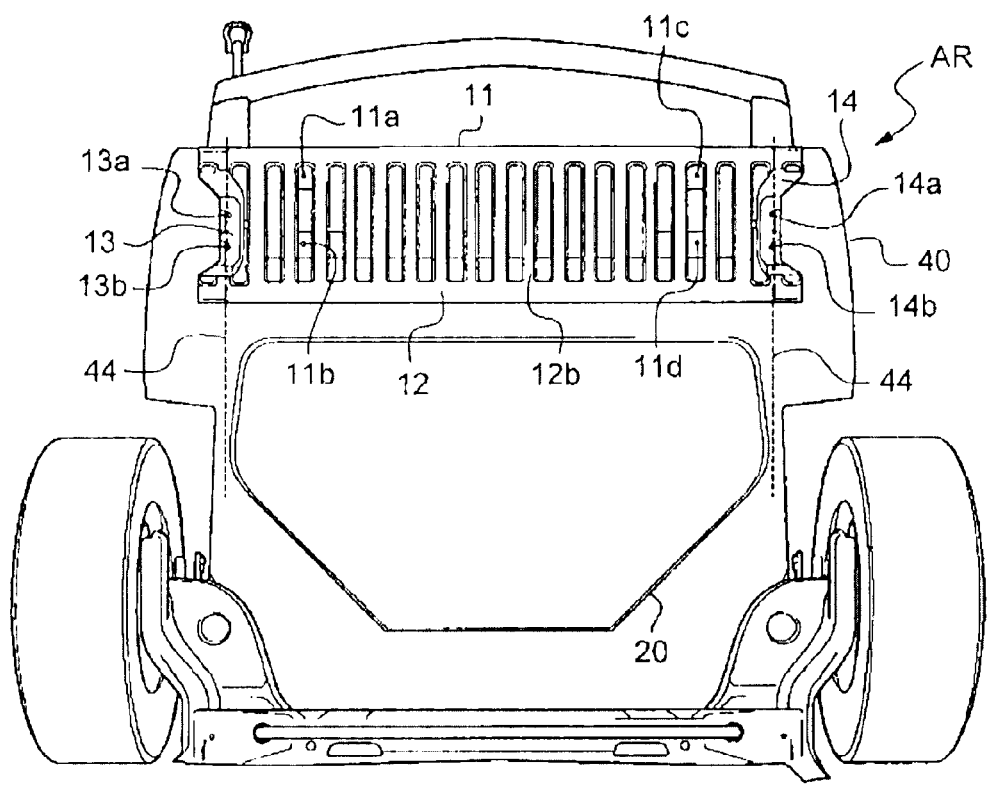
FIG. 3 is a bottom view showing an example installation of the protection device according to the invention in the rear of a motor vehicle, behind the member to be protected.
Figure 3:
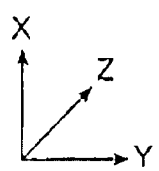

According to one embodiment, the fairing element 11 is preferably attached to the external face of the bottom cover plate 43 of the luggage-compartment back formed by the luggage-compartment tray 41, on the outside of the vehicle, for example using four securing screws, respectively 11a to 11d, as shown in FIG. 3. Furthermore, the lower support surface 12 of the fairing element 11 may be arranged such as to present a series of ledges 12b symmetrical to the ledges of the luggage-compartment tray, which absorb the stresses along the axis X. This means of attaching the fairing element using four screws to the bottom cover plate of the luggage-compartment back combined with the inclusion of stress-absorbing ledges along X symmetrical to the ledges of the luggage-compartment tray make it possible to efficiently absorb the residual stresses along X in the event of contact with the obstacle.

The fairing element 11 may also be provided with two appendices 13 and 14 forming linking means designed to bear against the lower face of the spars 44, thus enabling the transmission of the stresses exerted on the fairing element 11. These appendices are extensions of the fairing element 11 on either side of the lower support surface 12 assembled on the luggage-compartment tray 41 and they are attached to the spars, for example using securing screws, respectively 13a, 13b and 14a, 14b.

The fairing element and the environment thereof, in particular the luggage-compartment tray, must be rigid enough to support the weight of the motor vehicle at the rear along the axis Z and the resultant along the axis X related to the incline of the support surface, as well as to absorb the kinetic energy generated on impact with the obstacle.

FIG. 1 illustrates the case in which an obstacle 30 that is short enough to pass beneath the traction battery 20 during motor-vehicle maneuvers for which the battery is to be protected. In this case, no stress is exerted on the fairing element 11.

Figure 2:
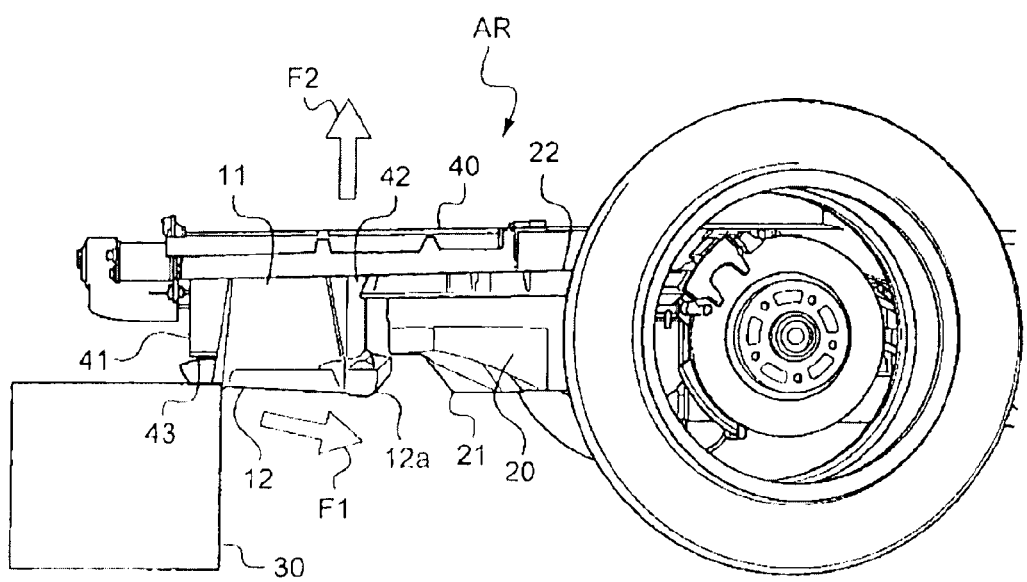
FIG. 2 is a side view of the rear of a motor vehicle in which the protection device according to the invention is installed, in a second "working" arrangement, in which a stress is exerted on the protection device (obstacle taller along Z than the low point of the member)

Conversely, FIG. 2 illustrates the case in which an obstacle 30 is taller than the bottom of the battery 21 along the axis Z. In this case, when the motor vehicle reverses over this obstacle 30, if the obstacle touches the fairing element 11, it bears against it and slides along the ramp formed by the lower support surface 12, in the direction shown by the arrow F1. As indicated previously, the fairing element 11 is then used as a support against the obstacle 30 to lift the vehicle and the battery via the luggage-compartment tray and the spars, in the direction indicated by the arrow F2. The fact that the end of the ramp defined by the low point 12a of the lower support surface 12 is arranged to always be lower than the bottom of the battery 21 along the vertical axis Z of the motor vehicle guarantees that the obstacle 30 moves in the direction F1 and is always lower than the bottom of the battery as long as it slides along the ramp formed by the lower support surface 12.

The fairing element 11 must therefore be dimensioned, in particular along the axis Z, such that even after the elastic deformation thereof and the plastic deformation of the environment (luggage-compartment back), the residual height along Z of the end of the ramp in relation to the bottom of the battery always enables the battery to be lifted above the obstacle. Furthermore, to take such deformations into account and to ensure that the end of the ramp of the fairing element is always lower along Z than the bottom of the battery, the fairing element 11 shall be over-dimensioned, in respect of the functional requirement, along Z by the value of the deformation of the faring element/environment combination.

On the other hand, the dimension along Z of the fairing element and the slope of the ramp formed by the lower support surface thereof must remain compatible with the ground clearance of the vehicle so as not to come into contact with roadway profiles such as parking-lot ramps.

The fairing element may also advantageously perform a driver-warning function, by generating a signal (noise, vibration) when it touches the obstacle and before the obstacle reaches the battery. Consequently, on detection of the noise or vibrations, the driver can apply the brake and drive forwards to clear the obstacle, which will slide in the opposite direction to F1 on the lower support surface of the fairing element.

As the fairing element of the protection device according to the invention is located in the underbody aerodynamic flow, the external form thereof may be adapted to channel the air and minimize drag.

This description relates to use on a motor vehicle intended to protect a traction battery mounted beneath the body thereof against rear impacts during specific vehicle maneuvers. However the device according to the invention may be used, in general, to protect any member assembled beneath a motor vehicle against obstacles that are taller along Z than the low point of the member and for which it is not easy to install a protector directly beneath the member, such as a 4×4 rear axle, a differential, a tank, etc.

The invention claimed is:

1. An impact protection device for a motor-vehicle member mounted protrudingly beneath the body thereof, comprising:
a fairing element rigidly connected to at least one structural body element of the motor vehicle located between a rear extremity of the motor vehicle from which an obstacle may appear during a reversing maneuver of the motor vehicle and the motor-vehicle member, which is positioned rearward of a rear axle of the motor vehicle along a longitudinal axis of the motor vehicle, to protect the member from impacts during the reversing maneuver;
the fairing element comprising a lower support surface extending beneath the body substantially between the extremity of the motor vehicle and the motor-vehicle member along a negative incline, such that a low point of the lower support surface is lower than a low point of the motor-vehicle member along a vertical axis of the motor vehicle, the low point being a forward-most part of the fairing element along the longitudinal axis and being positioned to the rear of a rear-most point of the motor-vehicle member along the longitudinal axis.

2. A device according to claim 1, wherein the fairing element is rigidly connected to an external face of a bottom cover plate of the luggage compartment back of the motor vehicle.

3. A device according to claim 1, wherein the fairing element is rigidly connected to spars of the motor vehicle such that the vehicle is lifted by contact with the obstacle.

4. A device according to claim 3, wherein the fairing element includes linking means extending from either side of the lower support surface of the fairing element, to bear against a lower face of the spars of the motor vehicle.

5. A device according to claim 1, wherein an incline of the lower support surface of the fairing element is between 1° and 45°.

6. A device according to claim 1, wherein the motor-vehicle member protected from impacts by the fairing element is a battery.

7. A device according to claim 6, wherein the battery is spaced apart from the fairing element along the longitudinal axis of the motor vehicle such that the fairing element is not positioned directly below the battery along the vertical axis.

8. A device according to claim 1, wherein the lower support surface of the fairing element is inclined at a downward angle from the rear extremity of the motor vehicle towards the motor-vehicle member.

9. A device according to claim 4, wherein the linking means of the fairing element are two appendices that extend from either side of the lower support surface of the fairing element to bear against the lower face of the spars of the motor vehicle.

10. A device according to claim 1, wherein an incline of the lower support surface of the fairing element is 5°.

* * * * *